US008966373B2

(12) United States Patent
Wan

(10) Patent No.: US 8,966,373 B2
(45) Date of Patent: Feb. 24, 2015

(54) METHOD AND SYSTEM FOR PRESENTING NETWORK RESOURCES

(75) Inventor: Yong Wan, Beijing (CN)

(73) Assignee: Beijing Sogou Technology Development Co., Ltd., Beijing (CN)

( * ) Notice: Subject to any disclaimer, the term of this patent is extended or adjusted under 35 U.S.C. 154(b) by 328 days.

(21) Appl. No.: 13/495,264

(22) Filed: Jun. 13, 2012

(65) Prior Publication Data

US 2012/0272155 A1 Oct. 25, 2012

Related U.S. Application Data

(63) Continuation of application No. PCT/CN2010/080456, filed on Dec. 29, 2010.

(51) Int. Cl.
*G06F 3/00* (2006.01)
*G06F 17/30* (2006.01)

(52) U.S. Cl.
CPC ............................... *G06F 17/30899* (2013.01)
USPC ............................ 715/739; 715/781; 715/206

(58) Field of Classification Search
USPC ......................................... 715/739, 206, 781
See application file for complete search history.

(56) References Cited

U.S. PATENT DOCUMENTS

2008/0276279 A1* 11/2008 Gossweiler et al. ............. 725/46
2009/0249244 A1* 10/2009 Robinson et al. .............. 715/781

* cited by examiner

*Primary Examiner* — Kieu Vu
*Assistant Examiner* — Joy M Weber
(74) *Attorney, Agent, or Firm* — Anova Law Group, PLLC

(57) ABSTRACT

A method is disclosed for presenting network resources on a computer having a browser. The method includes determining at least one network resource to be independently presented and obtaining network attribute information of the at least one network resource. The method also includes obtaining a resource list window for listing network resources that need to be presented independently using network resource as unit and displaying identification information of the at least one network resource in the resource list window. Further, the method includes, when a network resource corresponding to an entry of identification information in the resource list window needs to be independently presented, presenting the network resource independently using the network attribute information of the network resource.

22 Claims, 5 Drawing Sheets

METHOD AND SYSTEM FOR PRESENTING NETWORK RESOURCES

CROSS-REFERENCES TO RELATED APPLICATIONS

This application claims the priority of PCT patent application no. PCT/CN2010/080456, filed on Dec. 29, 2010, which claims the priority of Chinese patent application no. 200910244560.0, filed on Dec. 30, 2009, the entire contents of all of which are incorporated herein by reference.

FIELD OF THE INVENTION

The present invention generally relates to web browser technologies and, more particularly, to the methods and systems for presenting network resources.

BACKGROUND

A browser is to display network resources from the World Wide Web or other networks such as a local area network. The network resources include text, pictures, and video, etc., and the user can browse a variety of information through the browser. However, existing technologies often push various network resources to the user via web pages in accordance with a pre-programmed format, and the network resources can only be presented or shown at certain locations in web pages. Thus, under certain circumstances, it may be difficult to improve the efficiency for the user to access the network resources.

For example, when browsing a web page via a web browser, a user finds that the web page contains a video that she is interested in. If the user wants to watch the video, the user can click the "Play" button at the location of the video in the web page, and the video may then be played in the web page. However, if the user currently needs to deal with other things, such as browsing other web pages or using other application software to complete a task, the user may be unable to watch the video immediately. At this time, the user has to keep the web page open, so that the user can come back to that web page to click the "Play" button to watch the video. Therefore, during this process, the focus on web pages may be switched multiple times before the video is played. Especially when the user opens multiple web pages and there are multiple videos, the web page having the video needs to be found among the opened web pages. Thus, it may take even longer time to play the video and the efficiency for the user to access the network resources may be further reduced.

The disclosed methods and systems are directed to solve one or more problems set forth above and other problems.

BRIEF SUMMARY OF THE DISCLOSURE

One aspect of the present disclosure includes a method for presenting network resources on a computer having a browser. The method includes determining at least one network resource to be independently presented and obtaining network attribute information of the at least one network resource. The method also includes obtaining a resource list window for listing network resources that need to be presented independently using network resource as unit and displaying identification information of the at least one network resource in the resource list window. Further, the method includes, when a network resource corresponding to an entry of identification information in the resource list window needs to be independently presented, presenting the network resource independently using the network attribute information of the network resource.

Another aspect of the present disclosure includes a system for presenting network resources. The system includes an information obtaining unit, a list display unit, and a resource presentation unit. The information obtaining unit is configured to determine at least one network resource to be independently presented and to obtain network attribute information of the at least one network resource. The list display unit is configured to obtain a resource list window for listing network resources that need to be presented independently using network resource as unit and to display identification information of the at least one network resource in the resource list window. Further, the resource presentation unit is configured to, when a network resource corresponding to an entry of identification information in the resource list window needs to be independently presented, present the network resource independently using the network attribute information of the network resource.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
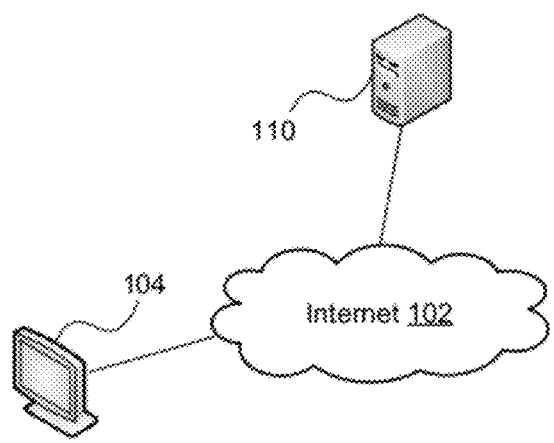
FIG. 1 illustrates an exemplary network environment incorporating certain aspects of the disclosed embodiments.

FIG. 1 illustrates an exemplary network environment incorporating certain aspects of the disclosed embodiments. As shown in FIG. 1, network environment 100 may include the Internet 102, a user computer 104, and a server 110. Other components may be added and certain devices may be removed without departing from the principles of the disclosed embodiments.

The Internet 102 may include any private and public computer networks interconnected using the standard transport control protocol/internet protocol (TCP/IP). Internet 102 may carry a large number of services over IP, such as the interlinked hypertext documents of the World Wide Web (WWW). Internet 102 may connect a large number of websites.

Figure 2:
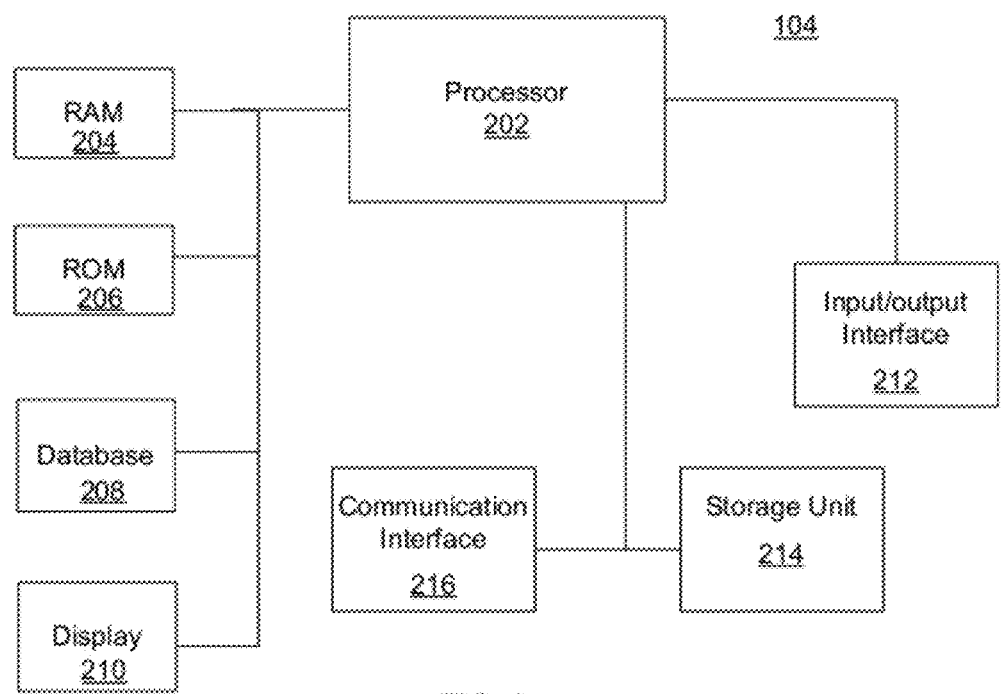
FIG. 2 illustrates a block diagram of an exemplary user computer consistent with the disclosed embodiments.

Server 110 may include any appropriate computer servers, software, and databases so as to provide various websites and web pages. Further, user computer 104 may include any appropriate types of computers operated by a user or users to access web-based or local web pages. For example, user computer 104 may include a desktop computer, a notebook computer, a tablet, a smart phone, and other types of computing platforms and software programs. FIG. 2 shows a block diagram of an exemplary user computer 104.

As shown in FIG. 2, user computer 104 may include a processor 202, a random access memory (RAM) unit 204, a read-only memory (ROM) unit 206, a database 208, a display 210, an input/output interface unit 212, a storage unit 214, and a communication interface 216. Other components may be added and certain devices may be removed without departing from the principles of the disclosed embodiments.

Processor 202 may include any appropriate type of graphic processing unit (GPU), general-purpose microprocessor, digital signal processor (DSP) or microcontroller, and application specific integrated circuit (ASIC), etc. Processor 202 may execute sequences of computer program instructions to perform various processes associated with user computer 104. The computer program instructions may be loaded into RAM 204 for execution by processor 202 from read-only memory 206.

Database 208 may include any appropriate commercial or customized database to be used by user computer 104, and may also include query tools and other management software for managing database 208. Display 210 may include any appropriate computer monitor, such as an LCD monitor. Further, input/output interface 212 may be provided for a user or users to input information into user computer 104 or for the user or users to receive information from user computer 104. For example, input/output interface 212 may include any appropriate input device, such as a remote control, a keyboard, a mouse, a microphone, a video camera or web-cam, an electronic tablet, voice communication devices, or any other optical or wireless input devices. Input/output interface 212 may include any appropriate output device, such as a speaker, or any other output devices.

Storage unit 214 may include any appropriate storage device to store information used by user computer 104, such as a hard disk, a flash disk, an optical disk, a CR-ROM drive, a DVD or other type of mass storage media, or a network storage. Further, communication interface 216 may provide communication connections such that user computer 104 may be accessed remotely and/or communicate with other systems through computer networks or other communication networks via various communication protocols, such as TCP/IP, hyper text transfer protocol (HTTP), etc.

User computer 104 may access various web pages from server 110 through Internet 102 or from local storages. The various web pages may contain one or more network resources so that the user computer 104 may access the network resources by the browser. Network resources, as used herein, may refer to any media contents capable being used in a web page, including single-media resources and/or multi-media resources. More specifically, such network resources may include, but not limited to, any one of video resources, audio resources, image resources, animation (including animated GIF or flash animation, etc.), text resources, and any combinations thereof. Of course, the network resources can also be certain resources created in the future that are related to a web page.

In operation, user computer 104 may be configured to access the web pages and to identify and present the network resources related to one or more web pages to a user or users of user computer 104. More particularly, user computer 104 may use certain software and/or hardware to present (e.g., to display, play, or interact) the various network resources to the user.

Figure 3A:
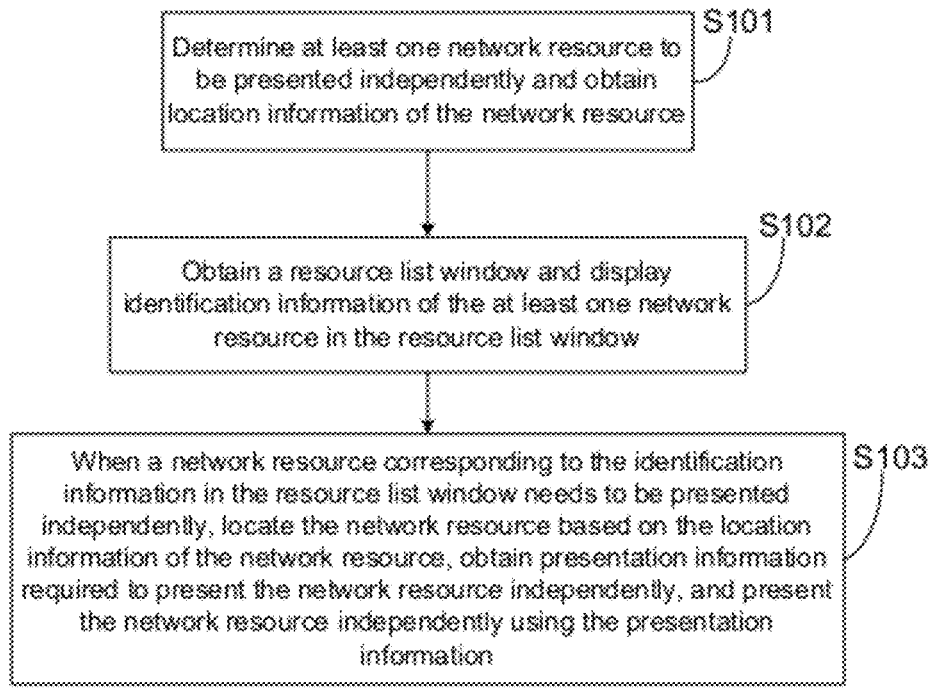
FIG. 3A illustrates an exemplary process for presenting network resources consistent with the disclosed embodiments.

FIG. 3A illustrates an exemplary process for presenting network resources performed by computer 104 or processor 202. As shown in FIG. 3A, at the beginning, processor 202 may determine at least one network resource needs to be presented independently and may obtain location information of the network resource (S101).

The term "presented independently" or "independent presentation" is defined to differentiate the conventional network resource presentation where the network resource is presented in a fixed location in the web page to which the network resource belongs. In the independent presentation, the network resource is presented without restriction from the original web page to which the network resource belongs.

More particularly, when the network resource is presented in the fixed position in the original web page, the relative position between the network resource and the window of the web page is fixed. Thus, when the scroll bar is dragged, the network resource scrolls along with the scrolling window of the web page. That is, available network resources continuously scroll in and out of viewable areas of the browser window.

However, in the independent presentation, the location where the network resource is presented is not affected by dragging the scroll bar. That is, the independently presented network resource does not scroll with the scrolling page window when the scroll bar is being dragged. Thus, the user can view the independently presented network resource while browsing other network resources in the web page by dragging the scroll bar. The efficiency for accessing the network resources may be increased.

At the same time, the independent presentation may be used to set the presentation window of the network resource to top of the display screen. Thus, the network resource can be viewable even when the current focus is switched to other web pages or even to other application programs.

The network resources that need to be presented independently may refer to those network resources that may be of interest or concern to the user. Such network resources may be determined in various ways. For example, the browser may automatically make a determination. The browser may recognize certain type(s) of network resources, such as video, as the network resources to be presented independently. Further, the user may also make a determination according to the user's own needs or interest, etc.

There may be multiple network resources that need to be presented independently, and each network resource may be from a different web page or several network resources may be from a same web page. Therefore, location information of each network resource may be obtained first. Based on the obtained location information, each network resource can be identified, e.g., from which web page and/or as which network resource in the web page, and the network resources can then be further presented independently.

The location information of a network resource may include uniform resource location information such as the URL of the web page where the network resource belongs, and the ID of the network resource in the web page, etc. The location information can then be used to identify which web page each network resource is from and what network resource in the web page to be presented. In certain embodiments, after the network resources to be presented independently are determined, the location information of the network resources are obtained and the obtained location information may be saved in a file, stored in memory, or preserved by other appropriate methods.

Of course, in some special cases, location information may only include the URL of a network resource (i.e., the web page of the network resource). For example, in situations where only a specific type of network resources need to presented independently, if there is only a single network resource of the specific type in all currently opened web pages or if only one network resource of the specific type exists in a web page, only the URL of the network resource may be obtained when extracting the location information of network resource. When the network resource needs to presented independently, the web page of the network resource can be found using the URL of the web page. The specific type network resource can then be found in the web page.

That is, the type of the network resource may be treated as auxiliary information on the network resource location. For example, if only video resources need to be independent presented and, among opened web pages, each web page contains no more than one video resource, only the URL of the web page of each video resource may be obtained. Based on the URL of the web pages, the web page of each video resource can be found and the specific type video resource can be found in the particular web page.

Returning to FIG. 3A, after obtaining the location information of the network resource (S101), processor 202 may obtain a resource list window and display identification information of the at least one network resources in the resource list window (S102).

After the network resources to be presented independently are determined, not all network resources may immediately need to be presented at the same time, especially for those resources such as video and audio that, when being played simultaneously, may cause hearing interference. Further, because video frames are continuously played, the user generally does not need to watch multiple videos at the same time.

However, the user may indeed want to watch multiple videos simultaneously. In this case, certain special processing may need to be performed. Otherwise, the user may have to complete playing one video independently before going back to the web page of another video to play the video independently. If the user has opened multiple web pages, the user may need to find the web page containing the desired video from the opened web pages; or if the user mistakenly closes the web page containing the desired video, the user may need to re-locate the URL of the web page, open the web page in the browser, and then trigger the independent presentation of the desired video.

To facilitate independently presenting multiple network resources, the resource list window may then be obtained. As used herein, the resource list window may refer to any window capable of displaying a list of network resources. After determining the network resources to be presented independently, processor 202 may obtain a resource list window, and then may display identification information of the determined network resources in the resource list window. That is, the resource list window may display a number of entries, and each entry may show the identification information corresponding to a network resource. In this way, the resource list window may record and display all network resources that need to be presented independently.

Further, because the location information of these network resources was previously obtained, a link can be established between the identification information and the location information for each network resource in the resource list window. When the identification information (i.e., the entry in the resource list window) is clicked by the user, the location information of the corresponding network resource can be linked. Thus, the identification information in the resource list window may be used to trigger independent presentation of the network resources. That is, the resource list window is used to organize all these network resources together, and each network resource can be triggered to be independently presented through these entries in the resource list window.

It should be noted that, although usually there are multiple network resources that need to be presented independently, there may be only one network resource that needs to be presented independently. For example, when the user manually selects network resources to be presented independently, such circumstance may exist. For instance, the user may find a video on a web page and may decide not to watch the video immediately. However, the user may be concerned about forgetting which web page the video belongs to or mistakenly closing the web page. The user may first record the video in the resource list window, and the browser may obtain the location information of the video in the background. When the user wants to watch the video, the user can link the location information of the video from the identification information in the resource list window.

The resource list window may be created particularly for the purpose of displaying the list of network resources. That is, after determining the network resources to be presented independently, processor 202 may create a new window as the resource list window. The browser can then list or display entries of the identification information of the network resources to be independently presented in the resource list window.

When the user manually specifies the network resources need to be presented independently, the resource list window may be created when the user specifies the first network resource. The identification information of the first network resource can then be automatically displayed in the resource list window as the first entry. Afterwards, when the user specifies other network resources, the identification information of the other network resources can be directly displayed as other entries in the resource list window.

Alternatively, an entrance can be provided in the browser to create a resource list window. The user may first create the resource list window through the entrance, and then specifies network resources to be presented independently.

Further, extraction entrances can be provided to the user for specifying the network resources to be presented. The user can then use the extraction entrances to specify the network resources. For example, corresponding entrances may be provided to the network resources listed in the resource list window. When the user wants to specify a particular network resource, the user can specify the particular network resource directly from the corresponding entrance.

When a resource list window already exists, other methods may also be used to specify network resources to be presented independently. For example, the user may add entries by the way of dragging the mouse. Using this method, the user can simply use the mouse to click on a desired network resource, press and hold the left mouse button, and to drag the desired network resource to the resource list window. Because the browser can detect the operation of the mouse, when the dragging event happens, the browser can directly add a new entry in the resource list window to display the identification information of the desired network resource. The browser can also obtain the location information of the desired network resource at the same time and create a link between the location information and the identification information.

In addition, an entrance may be provided for batch extraction (a batch extraction entrance), through which the user can specify multiple network resources in a batch. The identification information of these network resources can be displayed in the resource list window in a certain order, and the location information of network resources can also be obtained at the same time.

In addition to creating a resource list window, the user can also start a known player, such as an audio and/or video player locally installed by the user or a player provided by the browser, and can use the playlist window of the player as the resource list window. Of course, the player's play window is not necessarily used to present the network resources independently.

Similarly, the player may be started when the user specifies the first network resource, and the user can also use the mouse to drag network resources to be presented independently to the playlist window of the player.

In addition, the identification information of the network resources displayed in the resource list window may include any appropriate information, such as names of the network resources extracted from web pages, thumbnails, or URLs of the web pages. The browser may obtain the names, thumbnails, or URLs of the network resources from corresponding web pages. Further, the identification information can also be an identification randomly assigned to individual network resources. For example, the entries can be numbered in a sequence starting from the first entry. Various types of identification information may also be combined and the content of the identification information is not limited. Of course, if the names of the network resources are used as identification information, a user-prompting effect may be achieved, prompting the user which network resource each entry corresponds to.

When a network resource corresponding to the identification information in the resource list window needs to be presented independently, processor 202 may locate the network resource based on the location information of the network resource, obtain presentation information required to present the network resource independently, and present the network resource independently using the presentation information (S103).

Because a link relationship can be established between the identification information and the location information of individual network resources, i.e., linking to the location information of individual network resources through corresponding identification information, the location information of the network resource can be obtained directly from the link relationship when a network resource corresponding to the identification information needs to be presented. The network resource can then be located using the location information of the network resource. That is, it can be then determined which network resource in which web page needs to be presented independently.

Further, the presentation information for independently presenting the network resource can be obtained from the web page, and the network resource can be presented independently using the presentation information. Thus, the independent presentation of the network resource can be triggered via the identification information of the network resource displayed in the resource list window.

It should be noted that, after obtaining the location information of various network resources and displaying the identification information of the network resources in the resource list window, the user can close the web pages containing the various network resources. The user may even close the browser or, of course, may choose to leave the browser open. Different processing may then be performed based on the user's actions.

For example, when the user has not closed the web pages containing the various network resources and wants to present a network resource independently, the user can locate the corresponding web page and find the network resource to obtain the presentation information required for the independent presentation. On the other hand, if the user has closed the web pages containing the various network resources, the user may use the location information of the various network resources to reload the web pages containing the network resources. The user may then obtain the presentation information required for the independent presentation.

Additionally or optionally, the web pages may be reloaded in the background so as not to affect the user's browsing experience. If the browser has been closed, the browser may be automatically started and the web pages may be reloaded in the restarted browser.

In addition, when the user closes the resource list window, the user may optionally choose to save the contents (e.g., entries) of the current resource list window. The location information of the various network resources can be saved in a specified file. When these network resources need to be presented independently, the user can directly open the resource list window, and the entries from the save contents can be displayed in the resource list. When a network resource corresponding to an entry in the resource list window needs to be presented independently, the location information of the network resource can be automatically linked. The location information of the network resource can then be used to load the web page containing the network resource, and the presentation information for independently presenting the network resource can be obtained from the web page. Further, the network resource can be presented independently using the presentation information.

In other words, the network resources can be collected by adding favorite network resources to the resource list window. The user can view these network resources online, without downloading these network resources. For example, a user may like a TV series and the TV series may be divided into many episodes, each episode corresponding to a video. Using the above methods, the user can add the videos of all episodes of the TV series into the resource list window, and may trigger the independent presentation of any episode from the resource list window.

If the user cannot finish watching all episodes at once, the user can choose to keep the location information of the episodes. When the user wants to continue watching the TV series, the user can directly open the resource list window and trigger the independent presentation of a desired episode from the resource list window. Thus, the user does not need to manually open the web pages containing the videos or to locally download the videos. The efficiency of video playback may be improved and the required network and local resources for downloading the videos can be saved.

In certain aspects, the resource list window may function as a special "Favorites" folder. The special "Favorites" may be temporary or may be permanent if the contents of the resource list window are saved when the resource list window is closed. However, different from ordinary "Favorites", this special "Favorites" collects items using the network resource as a unit, while the ordinary "Favorites" collects items using the web page as a unit. It may be substantially easy to use this collection mechanism to meet the personalization requirements.

It should be noted that, network resources corresponding to one or more entries in the resource list window may be independently presented simultaneously. That is, a single network resource can be presented independently or multiple network resources may be presented independently and simultaneously. More particularly, the user may manually specify a certain resource(s) to be presented, the browser may automatically present the resources starting from the first entry in the resource list window, or the resource list window may provide a sequential presentation entrance and/or a cyclic presentation entrance. The user can choose a different entrance for the corresponding mode of the presentation and so on.

Further, because there are various ways to present the network resources independently, the presentation information used for the various ways may be different based on a particular way of presentation.

Figure 3B:
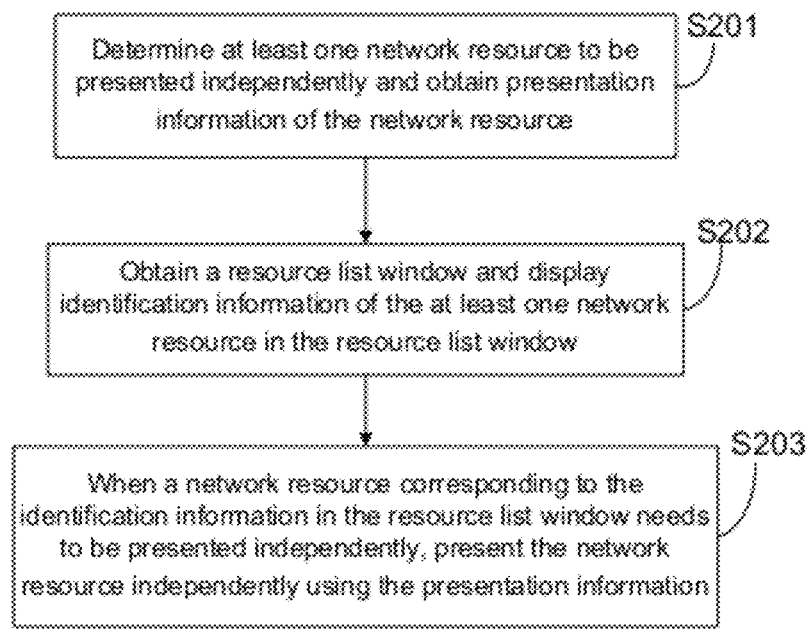
FIG. 3B illustrates another exemplary process for presenting network resources consistent with the disclosed embodiments.

FIG. 3B illustrates another exemplary process for presenting network resources performed by computer 104 or processor 202. As shown in FIG. 3B, processor 202 may determine at least one network resource needs to be presented independently and may obtain presentation information of the network resource (S201). That is, the presentation information of the network resource needs to be presented independently is obtained after the network resource is determined.

Further, processor 202 may obtain a resource list window and display identification information of the at least one network resource in the resource list window (S202). Because the presentation information of these network resources was obtained previously, a link relationship can be established between the identification information and the presentation information. When the identification information is clicked by the user, the presentation information of the corresponding network resource can be linked and the corresponding network resource is presented independently using the presentation information.

When a network resource corresponding to the identification information displayed in the resource list window needs to be presented independently, processor 202 may present the network resource independently using the presentation information (S203).

Because a link relationship can be established directly between the identification information and the presentation information of individual network resources, when a network resource corresponding to the identification information needs to be presented, the presentation information of the network resource can be obtained directly from the link relationship and the identification information in the resource list window.

That is, because the presentation information of the network resource to be independently presented has been obtained in advance, when the identification information in the resource list window triggers the independent presentation, the presentation information required to independently present the network resource can be obtained directly, without locating the network resource or obtaining the presentation information from the corresponding web page. The efficiency for independently presenting network resources can be further improved.

In addition, after obtaining the presentation information of various network resources and displaying the identification information of the network resources in the resource list window, the user can close the web pages containing the various network resources. The user may even close the browser or, of course, may choose to leave the browser open. However, same processing may be performed even though the user's actions may be different.

That is, because the presentation information required for independently presenting the network resources has been obtained, there may be no need to rely on the web pages containing the network resources. Thus, no matter whether the web pages or the browser is opened or closed, the presentation information can be directly used to present the network resources independently. Even if the web pages or the browser was closed, there is no need to reload the web pages to obtain the presentation information. Thus, the efficiency is substantially increased.

In addition, when the user closes the resource list window, the user may optionally choose to save the contents (e.g., entries) of the current resource list window. The presentation information of the various network resources can be saved in a specified file. When these network resources need to be presented independently, the user can directly open the resource list window, and the entries from the saved contents can be displayed in the resource list window. When a network resource corresponding to an entry in the resource list window needs to be presented independently, the presentation information of the network resource can be automatically linked. The presentation information of the network resource can then be used to independently present the network resource. Because the web pages containing the network resources do not need to be reloaded, the efficiency may be greatly improved.

The independent presentation of network resources may be implemented in various ways and different ways may require different presentation information to present the network resources independently. For example, the network resources may be presented in an independent window, or may be presented in a fixed location in the browser window.

When the network resources are presented in an independent window, several implementations may be used. For example, to use the independent window to present the network resources, an independent window may be created in advance, and the network resources can then be presented in the created independent window. More specifically, the independent window may be created in various ways.

An independent window, as used herein, may refer to a window that is independent from a web page window containing the identified network resource, such as a window with the desktop as the parent window, a dialog-box form floating window (e.g., floating toolbar windows of some applications can be dragged anywhere on the desktop of user computer 104), or a desktop window. In other words, operations on other windows such as the original web page window and the browser window might not affect the independent window.

After the independent window is created, processor 202 may change the parent window of the original web page window containing the network resource into the independent window, and to display elements of the web page in the independent window. More particularly, processor 202 may first locate the web page containing the network resources and, after changing the parent window of the web page into the independent window, move the page window relative to the independent window such that the area where the network resource is located is moved to the viewable region of the independent window. Further, processor 202 may adjust the size of the independent window such that the size of the independent window matches the size of the network resource. Thus, the network resource can be presented in the independent window. Of course, under certain circumstances, the sizes and relative positions of the windows do not need to be changed and the network resource can be presented in the independent window.

When using such mechanism to present the network resource independently, the presentation information may include: the URL of the web page where the network resource belongs, the ID, coordinate, and/or size of the network resource. In certain embodiments, coordinate and/or size of the network resource may be optional.

Also for example, when the network resource is a window-type, such as flash or audio/video in an embedded player, etc., processor 202 may change the parent window of the network resource window to the created independent window and present the network resource independently in the created independent window. More particularly, processor 202 may determine which resource on which web page among web pages containing individual network resources, and then change the parent window of the desired network resource window to the created independent window. Of course, if the window of the network resources does not match the created independent window, processor 202 may adjust the size of the independent window to match the size of the network resource to realize the independent presentation of the network resource. Under certain circumstances, the sizes and relative positions of the windows do not need to be changed and the network resource can be presented in the independent window.

When using such mechanism to present the network resource independently, the presentation information may include: the URL of the web page of the network resource and the ID, coordinate, and/or size of the network resource. In certain embodiments, coordinate and/or size of the network resource may be optional.

Further, if the web page containing the network resource is not closed, the opened web page can be directly used to realize the independent presentation of the network resource. For example, when location information is used in the resource list window, the network resource can be located via the location information, among which the URL of the web page containing the network resource and the ID of the network resource may be already determined. Only the coordinates and size or just the size of the network resource needs to be determined. The determined information can then be used to independently present the network resource.

On the other hand, when presentation information is used in the resource list window, the URL of the web page, the ID of network resource, and the coordinates and size of the network resource included in the presentation information is already obtained. The presentation information can then be used to independently present the network resource directly.

Of course, if the web page containing the network resource is closed, when location information is used in the resource list window, the web page containing the network resource is reloaded or reopened in the browser and the presentation information can then be obtained for independent presentation. When presentation information is used in the resource list window, the web page containing the network resource is also reloaded or reopened in the browser and the presentation information can then be directly used for independent presentation.

Additionally or alternatively, after the independent window is created, processor 202 may create a temporary browser navigation page window with the independent window as the parent window. That is, when the independent window is created, the independent window is an empty window without navigation functionalities. Because such window may be unable to reload web pages, the temporary browser navigation page window is created with the independent window as the parent window to add the navigation functionalities to the independent window, such as reloading web pages.

Further, processor 202 may reload the web page containing the network resource into the independent window based on the URL of the web page containing the network resource. If needed, processor 202 may adjust the sizes and relative positions of the browser navigation page window and the independent window such that only the network resource is presented in the independent window. Under certain circumstance, the network resource may be presented in the independent window without adjusting the sizes and relative positions of the browser navigation page window and the independent window.

When using such mechanism to present the network resource independently, the presentation information may include: the URL of the web page of the network resource and the ID, coordinate, and/or size of the network resource. In certain embodiments, coordinate and/or size of the network resource may be optional.

Further, if the web page containing the network resource is closed, when location information is used in the resource list window, the web page containing the network resource is first reloaded or reopened in the browser. The presentation information (e.g., the coordinates and size of the network resource) can then be obtained from the web page. Afterward, based on the presentation information, the web page is again reloaded in the independent window and the sizes and relative positions of the browser navigation page window and the independent window are adjusted. Thus, the web page may be loaded twice. On the other hand, when presentation information is used in the resource list window, the web page may only need to be loaded once into the independent window.

Further, if the network resource needs to make use of a player embedded in the web page, such as an audio and/or video resource, after creating the temporary browser navigation page window with the independent window as the parent window, the browser navigation page window can be directly used to reload the player into the independent window to present the audio and/or video resource in the independent window.

When using such mechanism to present the network resource independently, the presentation information may include: the source code of the player embedded in the web page. After the source code of the player is determined, the player can be reloaded in the independent window to present the audio and/or video resource. Because the web page does not need to be reloaded into the independent window, the loading speed can be increased.

Further, if the web page containing the network resource is closed, when location information is used in the resource list window, the web page containing the network resource is first reloaded or reopened in the browser. The source code of the player can then be obtained from the web page. Afterward, the player can be reloaded into the independent window. On the other hand, when presentation information is used in the resource list window, the player may be directly reloaded into the independent window.

It should be noted that, when presentation information is used in the resource list window, the presentation information used by the various mechanisms can be obtained in advance. That is, in addition to the URL of the web page containing the network resource and the ID, coordinates, and size of the resource, etc., other information can also be obtained. For example, if the network resource needs to be played in a player embedded in the web page, the source code of the player can be obtained; if the network resource is a video, the URL of the FLV format file of the video can also be obtained; and so on. Thus, the presentation information obtained in advance can be used by different presentation mechanisms in the real-time to present the network resource independently.

Further, when the independent window is created to realize the independent presentation, the resource list window can also be created. The independent window and the resource list window may be created at the same time, or the resource list window may be created first and the independent window may be created when the independent presentation is requested. Alternatively, one of the two windows may be used as a parent window to create the other window. For example, when the two windows are created at the same time, the independent window may be used as the parent window to create the resource list window. When the independent window is created in a later time, the resource list window may be used as the parent window to create the independent window. Of course, the two windows may be created without a parent-child relationship such that closing of one window does not affect the other window. But the two windows can still exchange information based on the characteristics of the operating system.

In addition, for the video resources, although the resources are presented in the independent window, the player actually used is still the player in the web page containing the network resource. Thus, when presenting different network resources, the size and appearance, etc., of the independent window may be different. This may be determined by the player playing the network resource in the web page containing the network resource. Optionally, the size of the resource list window may be adjusted according to the size of the independent window such that the sizes of the two windows match.

In addition or alternative to creating an independent window to realize the independent presentation, an existing or known player may be started as an independent window to present the network resources independently.

This presentation method may be desired for the video-type network resources. Corresponding presentation information may include: the URL of the FLV format file of the video resource, which is equivalent to the network path of the video resource. Because the player can play a video based on the network path, when the video is played in the player, the player can directly play the video based on the URL of the FLV format file of the video. In other words, the player in the original web page containing the network resource is not used; instead the existing or known player is used. The existing player may be installed locally or may be provided by the browser.

However, different from the created independent window, the existing player can use the playlist window of the player as the resource list window when playing the video resource. To play a video corresponding to an entry in the playlist window, the video can be directly played in the play window of the existing player. Thus, it may look no different from playing a local video file.

Further, in certain other embodiments, the network resources can also be presented in a relatively-fixed position in the browser window. That is, the network resources are still presented in the original browser window, but are no longer limited by the web page. When scroll bar scrolls, the network resource is not moved out of the viewable area of the browser window.

This presentation method can be achieved by modifying the coordinate type of a network resource. The presentation information using this method may include: the URL of the web page containing the network resource and the ID of the network resource, etc. The web page of the network resource can then be determined and the resource can be found in the web page. Further, the coordinate type of the network resource can be changed to the coordinate type that is fixed relatively to the browser window. Using this presentation method, it appears that the network resource is floating on the original page window, so-called the floating presentation method.

Using the floating presentation method, if the network resource needs to be presented in a specified location relative to the browser window, the coordinates of the network resource are also obtained and then modified. Further, if the web page containing multiple network resources displayed at different layers, the layer for the network resource to be presented may also be determined and modified to the highest layer to prevent from being blocked by other resources. In addition, the dimension type of the network resource may also be obtained. When the dimension type is relative size, the dimension type of the network resource may be changed to absolute size. Other adjustments may also be performed. Thus, the presentation information for the independent presentation may also include the coordinates, layer, and dimension type, etc., of the network resource.

In addition, in certain embodiments, the network resource to be presented may be a network resource in an iframe frame (e.g., an HTML structure or other frame structure used in web pages). The coordinate type of the iframe of the network resource may need to be modified to fixed coordinates relative to the browser window. Thus, the presentation information for the independent presentation may include URL of the web page containing the network resource and the ID of the iframe of the network resource. Of course, the presentation information may also include other information such as the iframe's coordinates, layer, and dimension/size type, etc.

Further, the resource list window may be a created window when the floating presentation method is used. Because the individual network resources displayed in the resource list window still belong to their respective web pages, the network resources need to be presented within their corresponding web pages. When network resources displayed in the resource list window belong to different web pages and the network resources are presented via the floating presentation method, the web page of a network resource to be presented may need to be switched to focus first. In certain embodiments, the resource list window may be set top, so that the resource list window can always be displayed no matter which web page is switched to focus. The user can trigger the floating presentation of network resources regardless of which web page is currently in-focus. Further, the relationship between the display area of the floating presentation and the resource list window may be defined based on the particular application or by the user. For example, the display area of the floating presentation and the resource list window may be integrated together, or may be kept as independent from each other.

Figure 5:
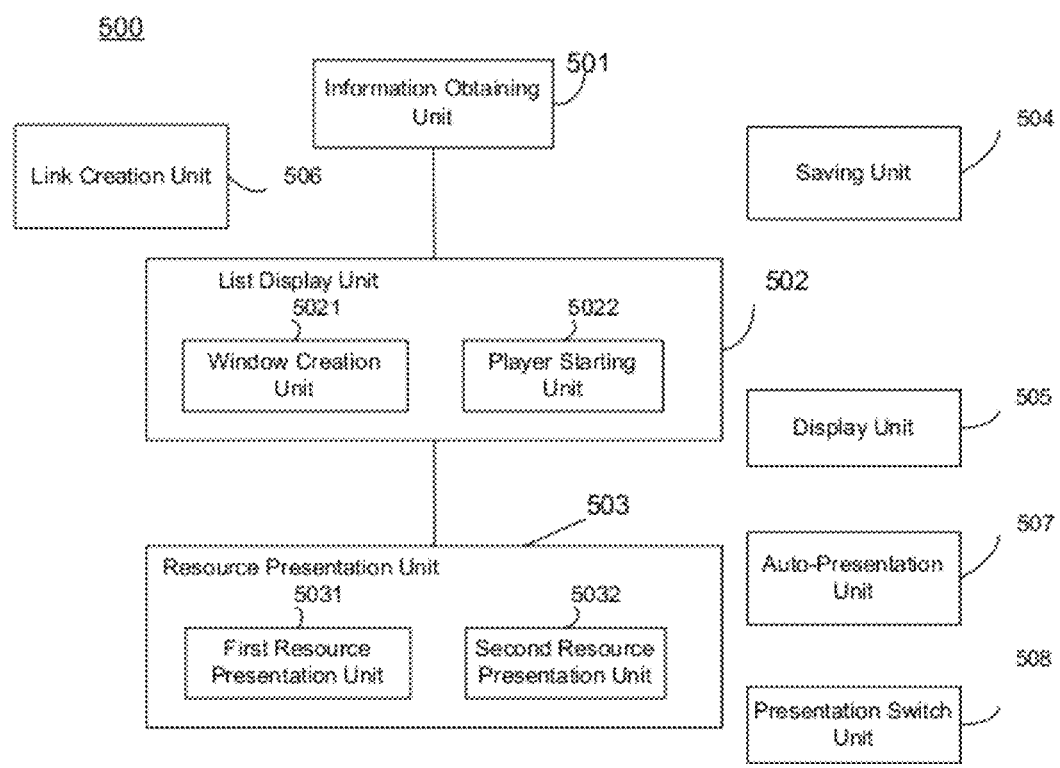
FIG. 5 illustrates an exemplary independent presentation system consistent with the disclosed embodiments.

FIG. 5 illustrates an exemplary network resource independent presentation system 500 implemented in user computer 104 (e.g., processor 202). As shown in FIG. 5, system 500 may include an information obtaining unit 501, a list display unit 502, a resource presentation unit 503, a saving unit 504, a display unit 505, a link creation unit 506, an auto-presentation unit 507, and a presentation switch unit 508. Certain unit(s) may be omitted and other unit(s) may be added. Further, list display unit 502 may include a window creation unit 5021 and a player starting unit 5022, and resource presentation unit 503 may include a first resource presentation unit 5031 and a second resource presentation unit 5032. The functionalities of these units are consistent with various processes for presenting network resources independently as described in this disclosure.

The information obtaining unit 501 may be configured to determine at least one network resource needs to be presented independently and to obtain network attribute information of network resources. The network attribute information may include any appropriate information related the network resource.

For example, the network attribute information can be the location information as previously described, including the URL of the web page of the network resource and the ID of the network resource, etc. The network attribute information can also be the presentation information as previously described, including the URL of the web page of the network resource, the ID, coordinate, and size of the network resource, source code of a player used to play a video resource, and/or the URL of FLV format file of a video resource. Other network attribute information can also be used.

The list display unit 502 may be configured to obtain a resource list window and to display the network attribute information of the network resources in the resource list window. More particularly, the window creation unit 5021 may be configured to create a new resource list window and to display identification information of the network resources in the resource list window, and the network attribute information is associated with or linked with the identification information. The player starting unit 5022 may be configured to start an existing player and to use the playlist window of the player as the resource list window to display identification information of the network resources in the resource list window.

Further, the resource presentation unit 503 is configured to, when a network resource corresponding to an entry of the identification information in the resource list window needs to be presented independently, independently present the network resource using the network attribute information of the network resource. Further, the first resource presentation unit 5031 may be configured to locate the network resource using the location information of the network resource, to obtain the presentation information of the network resource, and to independently present the network resource using the presentation information. In addition, the second resource presentation unit 5032 may be configured to independently present the network resource directly using the presentation information from the resource list window.

When the resource presentation unit 503 is configured to independently present the network resource, the resource presentation unit 503 may use an independent window method or may use a floating presentation method. That is, the resource presentation unit 503 may present the network resource in an independent window or the resource presentation unit 503 may present the network resource within the browser window at a fixed position relative to the browser window.

Further, as previously described, system 500 may include the saving unit 504 and the display unit 505. The saving unit 504 may be configured to save the contents of the resource list window when the resource list window is closed by the user or by other reasons; the display unit 505 may be configured to display the network resources in the resource list window when the resource list window is opened, and may also be configured to present the network resource using the network attribute information from the resource list window.

In addition, the link creation unit 506 may be configured to create a link relationship between the identification information of the network resource displayed in the resource list window and the network attribute information of the network resources. Further, when receiving a request to present the network resource corresponding to an entry of identification information of the network resource, the resource presentation unit 503 is configured to determine the network attribute information of the network resource based on the link relationship and to independently present the network resource using the network attribute information of the network resource.

The auto-presentation unit 507 may be configured to, after an independent presentation of a network resource is completed, automatically and independently present a next network resource from the resource list window (e.g., next entry of identification information). Further, during the independent presentation of one network resource, if a request for presenting a network resource corresponding to another entry in the resource list window, the presentation switch unit 508 may be configured to switch the presentation and to independently present the requested network resource and to close or stop the current network resource in independent presentation or to revert the current network resource to its original web page for display.

Figure 3C:
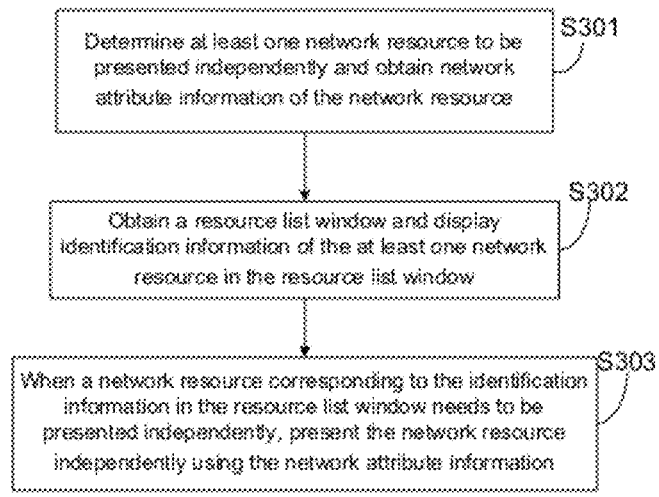
FIG. 3C illustrates another exemplary process for presenting network resources consistent with the disclosed embodiments.

FIG. 3C illustrates another exemplary process for presenting network resources performed by independent presentation system 500 (e.g., computer 104 or processor 202). As shown in FIG. 3C, system 500 (e.g., information obtaining unit 501) may determine at least one network resource needs to be presented independently and may obtain network attribute information of the network resource (S301).

Further, system 500 (e.g., list display unit 502) may obtain a resource list window and display the identification information of the at least one network resource in the resource list window (S302). When a network resource corresponding to an entry of the identification information in the resource list window needs to be presented independently, system 500 (e.g., resource presentation unit 503) may independently present the network resource using the network attribute information of the network resource (S303).

Figure 4A:
FIG. 4A illustrates an exemplary display screen consistent with the disclosed embodiments.

FIG. 4A illustrates an exemplary display screen consistent with the disclosed embodiments. As shown in FIG. 4A, browser window 402 displays various web pages and resources, and the independent presentation is realized by creating an independent window 404. Further, resource list window 406 is integrated with the independent window. As shown in FIG. 4A, three entries of identification information displayed in resource list window 406 represent three video resources, and the currently presented video resource in the independent window 404 is related to the first entry in the resource list window 406 with highlight.

Figure 4B:
FIG. 4B illustrates another exemplary display screen consistent with the disclosed embodiments.

FIG. 4B illustrates another exemplary display screen when the third entry in the resource list window 406 is doubled clicked by the user. As shown in FIG. 4B, a player 408 is loaded into the independent window 404 to present the video resource corresponding to the third entry of the identification information displayed in the resource list window 406 with highlight. The size and appearance of the independent window 404 are also changed according to the player in the original web page containing the video resource. At the same time, the size of the resource list window 406 also changes accordingly. Of course, the relative position between the independent window 404 and the resource list window 406 is shown for illustrative purposes, other positions and/or other arrangements (e.g., from left to the right horizontally) may also be used. Also, the identification information in the resource list window may be displayed as or together with thumbnails of individual videos.

Further, a variety of ways may be used to determine network resources to be independently presented. For example, types of network resources to be presented independently may be predetermined, and the browser can identify the types of individual network resources. When the browser determines a network resource having a predetermined type, the browser can automatically determine that the network resource having the predetermined type needs to be presented independently. For example, if the predetermined type of network resource is video resource, when there is any video resource in a web page identified as a video resource, the browser automatically determines that the network resource needs to be presented independently.

In certain embodiments, to avoid interfering with the user's normal browsing activities, after identifying any network resources with predetermined type in the web pages, processor 202 may optionally provide the user with an entrance to extract the network resources into the resource list window. At the same time, this entrance can also be used as a prompt for the user to indicate that the network resource can be presented independently. After receiving a request for independent presentation from the user through the entrance, the corresponding network resource is determined as the network resource to be presented independently and other actions are performed to present the network resource independently.

Optionally, a shortcut key can be configured. By clicking on the shortcut key, network resources on a web page or all the web pages currently opened can be extracted at once into the resource list window. Of course, the term "extracting the network resources into the resource list window" refers to displaying the identification information of the network resources in the resource list window and, at the same time, obtaining location information or presentation information or other network attribute information for independent presentation.

The predetermined type of the network resources may be included in the browser's configuration parameter. The browser may set this parameter by default, or the user may manually set the parameter. For example, if the user wants to independently display image resources, the user can set the corresponding configuration parameter as image-type resource. Further, multiple types may be set at the same time as the configuration parameter, such as the video-type and the image-type both, etc.

In certain embodiments, when network resources may be presented independently without determining the resource type, the browser does not need to identify types of the network resources and may only provide the user with an entrance to various network resources in the web page. For example, when the user moves the mouse over network resources, an entrance may be provided to the user to individual network resources. The user can selectively click on the entrance of any network resource based on the user's needs or interest. The browser receives the user's request through the entrance, determines that the network resource requested by the user as the network resource to be presented independently, and performs actions for the independent presentation. Thus, the browser does not have to identify the network resources, which may reduce system overhead. From the user's point of view, the network resources are not limited to only preset types and the flexibility is increased.

It should be noted that various methods may be used to determine specific types of network resources. For example, one of the methods can be: in the process of moving the mouse by the user, relevant information of page elements under the mouse can be obtained by using function(s) provided by the browser. Such information may include tag, type, name, class identifier ClassID, and parent node, etc., of the page elements. The type of the network resource can then be determined based on such information. For example, if a page element has a tag of <img>, the type of the network resource may be determined as an image-type; if a page element has a tag of <object>, the ClassID of the page element may be further checked to determine whether the page element is an audio/video player embedded in the web page and to further determine whether the network resource corresponding to the page element is an audio or video resource, etc.

Another method for determining the type of network resources can be: analyzing the request sent by the browser to the server when loading the web page or the data sent by the server in response to determine the type of network resources. This method can identify all types of network resources with high accuracy, especially when the data portion of the response returned by the server is analyzed to identify the network resources.

Because it may take some time to complete the presentation of certain network resources such as video resource, some arrangements may be set to facilitate this process. For example, after the independent presentation of one network resource is completed, the network resource corresponding to the next entry of the identification information in the resource list window can be automatically presented independently. When a network resource is being presented independently, if a request to present the network resource corresponding to another entry of the identification information in the resource list window, the requested network resource can be presented and the network resource currently presented can be closed, stopped, or revert to its original web page for presentation. Alternatively, the requested network resource may be presented independently at the same time without changing the presentation of the current network resource.

For example, during playback of a previous video, new video page element is also extracted. The identification information (e.g., name) of the new video element is displayed in the playlist window, but the new video element may not be immediately and independently played, until the playback of the previous video is completed. Optionally, the new video element can be immediately and independently played, while the previous video is closed, stopped, or reverted to the original web page for playing. Alternatively, the user can double-click on the entry of identification information corresponding to a particular video resource to trigger the independent presentation of the video resource and to stop the current independent presentation of the previous video. Other configurations may also be used. Thus, if the user wants to watch different videos in multiple web pages, the user only needs to extract the videos into the resource list window and then to trigger the independent presentation of the videos from the resource list window.

In addition, when one or more network resources are presented independently, the resource list window can be minimized such that the window for presenting the network resources can be maximized. When the resource list window is again needed, the resource list window can then be displayed.

The disclosed systems and methods may provide many advantageous browser and other software applications in a variety of network or client environments, such as in personal computer equipment and the like, mobile phones, mobile communication devices, personal digital assistants (PDAs) and other electronic equipment. Other applications and advantages are obvious to those skilled in the art.

What is claimed is:

1. A method for presenting network resources on a computer having a browser, comprising:

determining at least one network resource to be independently presented from at least one web page displaying network contents;

obtaining network attribute information of the at least one network resource;

obtaining a resource list window for listing network resources that need to be presented independently using a network resource as a unit;

displaying identification information of the at least one network resource in the resource list window; and when a network resource corresponding to an entry of identification information in the resource list window needs to be independently presented, presenting the identified network resource independently in a resource presentation window using the network attribute information of the network resource;

wherein presenting the identified network resource independently further includes:

creating the resource presentation window and the resource list window in such a way that the resource presentation window and the resource list window are integrated into a single display window;

when the resource presentation window and the resource list window are created at the same time, creating the resource presentation window as a parent window to create the resource list window; and when resource presentation is not requested, creating the resource list window first and, when requested at a later time, creating the resource presentation window as a child window of the resource list window, and presenting the identified network resources in the created presentation window.

2. The method according to claim 1, wherein:

obtaining the network attribute information further includes obtaining location information of the at least one network resource; and presenting the network resource independently further includes locating the network resource using the location information of the network resource, obtaining presentation information required to independently present the network resource, and independently presenting the network resource using the presentation information.

3. The method according to claim 1, wherein:

obtaining the network attribute information further includes obtaining presentation information required for independently presenting the at least one network resource; and presenting the network resource independently further includes independently presenting the network resource using the presentation information.

4. The method according to claim 3, wherein:

the presentation information of the network resource includes at least a uniform resource locator (URL) of a web page containing the network resource and identifier (ID) of the network resource;

when the network resource is a video resource, the presentation information of the network resource includes at least source code of a player used to play the network resource or URL of a flash video (FLV) format file of the video resource; and when the network resource is in an iframe frame, the presentation information of the network resource includes at least the URL of the web page containing the network resource and ID of the iframe frame.

5. The method according to claim 3, wherein obtaining the network attribute information further includes obtaining network resource location information used to locate the network resource, and wherein the network resource location information includes at least one uniform resource locator (URL) of at least one web page displaying network contents.

6. The method according to claim 1, wherein presenting the network resource independently further includes:

when a user requests to present the network resource in an independent window, presenting the network resource in the independent window; and when a user requests to present the network resource within a browser, presenting the network resource within the browser window at a fixed position relative to the browser window, wherein the integrated display window of the presentation window and the resource list window overlay the original web page and the integrated display window is presented in a floating way such that the presented network resource does not scroll with the scrolling page window when the scroll bar is being dragged.

7. The method according to claim 6, wherein presenting the network resource within a browser window at a fixed position relative to the browser window further includes:

modifying a coordinate type of a network resource to fix relatively to the browser window;

when the network resource needs to be presented in a specified location relative to the browser window, obtaining and modifying the coordinates of the network;

when the web page containing multiple network resources displayed at different layers, determining and modifying the layer for the network resource to be presented to the highest layer to prevent from being blocked by other resources;

when a dimension type of the network resource is relative size, changing the dimension type to absolute size; and when the network resource to be presented is in an iframe frame, modifying the coordinate type of the iframe of the network resource to fixed coordinates relative to the browser window.

8. The method according to claim 1, wherein obtaining the resource list window further includes creating a new window as the resource list window or starting a known player to use a playlist window of the player as the resource list window.

9. The method according to claim 1, further including:

when closing the resource list window, saving the network attribute information of the network resource; and when opening the resource list window, independently presenting the network resource using the saved network attribute information of the network resource.

10. The method according to claim 1, further including:

creating a link relationship between the identification information of the network resource displayed in the resource list window and the network attribute information of the network resource; and when receiving a request to present the network resource corresponding to an entry of identification information of the network resource, determining the network attribute information of the network resource based on the link relationship and independently presenting the network resource using the network attribute information of the network resource.

11. The method according to claim 1, further including:

after completing an independent presentation of one network resource, automatically and independently presenting a network resource corresponding to a next entry of identification information in the resource list window.

12. The method according to claim 1, further including:

receiving a request for independently presenting a network resource corresponding to a next entry of identification information in the resource list window during independent presentation of another network resource;

independently presenting the network resource corresponding to the next entry of identification information in the resource list window; and closing or stopping the another network resource or reverting the another network resource to an original web page of the another network resource for display, wherein the integrated display window of the presentation window and the resource list window overlay the original web page and the integrated display window is presented in a floating way such that the presented network resource does not scroll with the scrolling page window when the scroll bar is being dragged.

13. The method according to claim 1, wherein creating a resource presentation window further includes:

when the identified network resource is a web page, changing the parent window of the original web page window containing the network resource into the resource presentation window, and displaying elements of the web page in the resource presentation window;

when the network resource is a window-type, changing the parent window of the network resource window to the created resource presentation window and presenting the network resource independently in the created window;

when the resource presentation window is already created, creating a temporary browser navigation page window with the resource presentation window as the parent window and reloading the web page containing the network resource into the resource presentation window based on the uniform resource locator (URL) of the web page containing the network resource; and when the network resource needs to make use of a player embedded in the web page, after creating the temporary browser navigation page window with the resource presentation window as the parent window, directly using the browser navigation page window to reload the player into the resource presentation window to present the audio and/or video resource in the resource presentation window.

14. The method according to claim 1, wherein determining at least one network resource to be independently presented from at least one web page displaying network contents further includes:

providing an entrance for batch extraction through which the user specifies multiple network resources in a batch; and providing a shortcut key such that by clicking on the shortcut key, network resources on a web page or all the web pages currently opened can be extracted at once into the resource list window.

15. A system for presenting network resources, comprising:

an information obtaining unit configured to determine at least one network resource to be independently presented from at least one web page displaying network contents and to obtain network attribute information of the at least one network resource;

a display unit configured to obtain a resource list window for listing network resources that need to be presented independently using the network resource as a unit and to display identification information of the at least one network resource in the resource list window; and a resource presentation unit configured to, when a network resource corresponding to an entry of identification information in the resource list window needs to be independently presented, present the identified network resource independently in a resource presentation window using the network attribute information of the network resource;

wherein the resource presentation unit and the display unit are further configured to:

create the resource presentation window and the resource list window in such a way that the resource presentation window and the resource list window are integrated into a single display window;

when the resource presentation window and the resource list window are created at the same time, create the resource presentation window as a parent window to create the resource list window; and when resource presentation is not requested, create the resource list window first and, when requested at a later time, to create the resource presentation window as a child window of the resource list window, and to present the identified network resources in the created presentation window.

16. The system according to claim 15, wherein:

the network attribute information includes location information of the at least one network resource; and the resource presentation unit includes a first resource presentation unit configured to locate the network resource using the location information of the network resource, to obtain presentation information required to independently present the network resource, and to independently present the network resource using the presentation information.

17. The system according to claim 15, wherein:

the network attribute information includes presentation information required for independently presenting the at least one network resource; and the resource presentation unit includes a second resource presentation unit configured to independently present the network resource using the presentation information.

18. The system according to claim 15, wherein the resource presentation unit is further configured to:

when a user requests to present the network resource in an independent window, present the network resource in the independent window; and when a user requests to present the network resource within a browser, present the network resource within the browser window at a fixed position relative to the browser window, wherein the integrated display window of the presentation window and the resource list window overlay the original web page and the integrated display window is presented in a floating way such that the presented network resource does not scroll with the scrolling page window when the scroll bar is being dragged.

19. The system according to claim 15, wherein the display unit further includes:

a window creation unit configured to create a new window as the resource list window; and a player starting unit configured to start a known player to use a playlist window of the player as the resource list window.

20. The system according to claim 15, further including:

a saving unit configured to, when closing the resource list window, save the network attribute information of the network resource; and a display unit configured to, when opening the resource list window, independently present the network resource using the saved network attribute information of the network resource.

21. The system according to claim 15, further including:
a link creation unit configured to create a link relationship between the identification information of the network resource displayed in the resource list window and the network attribute information of the network resource,
wherein the resource presentation unit is further configured to, when receiving a request to present the network resource corresponding to an entry of identification information of the network resource, determine the network attribute information of the network resource based on the link relationship and independently present the network resource using the network attribute information of the network resource.

22. The system according to claim 15, further including:
an auto-presentation unit configured to, after completing an independent presentation of one network resource, automatically and independently present a network resource corresponding to a next entry of identification information in the resource list window; and
a presentation switch unit configured to:
receive a request for independently presenting a network resource corresponding to the next entry of identification information in the resource list window during independent presentation of another network resource;
independently present the network resource corresponding to the next entry of identification information in the resource list window; and
close or stop the another network resource or revert the another network resource to an original web page of the another network resource for display,
wherein the integrated display window of the presentation window and the resource list window overlay the original web page and the integrated display window is presented in a floating way such that the presented network resource does not scroll with the scrolling page window when the scroll bar is being dragged.

* * * * *